United States Patent [19]

Shini

[11] Patent Number: 4,713,281

[45] **Date of Patent: * Dec. 15, 1987**

[54] MULTIPLE-USE PRESSURE-SENSITIVE TRANSFER RECORDING MEDIA

[75] Inventor: Masami Shini, Itami, Japan

[73] Assignee: Fuji Kagakushi Kogyo Co., Ltd., Osaka, Japan

[ * ] Notice: The portion of the term of this patent subsequent to Nov. 25, 2003 has been disclaimed.

[21] Appl. No.: 905,442

[22] Filed: Sep. 10, 1986

Related U.S. Application Data

[63] Continuation-in-part of Ser. No. 753,173, Jul. 9, 1985, Pat. No. 4,624,881.

[30] Foreign Application Priority Data

| | | | |
|---|---|---|---|
| Jul. 13, 1984 | [JP] | Japan | 59-146524 |
| Sep. 18, 1984 | [JP] | Japan | 59-195374 |

[51] Int. Cl.$^4$ .......................... B32B 3/26; B32B 5/18; B41J 31/02

[52] U.S. Cl. ...................................... 428/207; 106/22; 400/241.2; 428/321.1; 428/321.3; 428/323; 428/914

[58] Field of Search ..................... 428/321.3, 207, 914, 428/320.2, 323, 321.1; 400/241.2; 101/473; 106/22

[56] References Cited

U.S. PATENT DOCUMENTS

| | | | |
|---|---|---|---|
| 4,018,162 | 4/1977 | Sharkey | 101/473 |
| 4,069,179 | 1/1978 | Jones | 260/23 R |
| 4,217,388 | 8/1980 | Scott et al. | 428/321.3 |
| 4,336,767 | 6/1982 | Wada | 428/321.3 X |
| 4,427,739 | 1/1984 | Kohle et al. | 428/321.3 X |
| 4,515,489 | 5/1985 | Kohle et al. | 400/241.2 |
| 4,544,292 | 10/1985 | Kohle et al. | 400/241.2 |
| 4,624,881 | 11/1986 | Shini | 428/207 |

FOREIGN PATENT DOCUMENTS

| | | | |
|---|---|---|---|
| 152512 | 11/1979 | Japan | 106/22 |
| 36481 | 3/1983 | Japan | 106/22 |
| 92584 | 6/1983 | Japan | 106/22 |

OTHER PUBLICATIONS

Chemical Abstracts, vol. 92, No. 18, May 5, 1980, p. 587, col. 2, No. 172484b.

Patent Abstracts of Japan, vol. 7, No. 116 (M-216), 1261, May 20, 1983.

Patent Abstracts of Japan, vol. 7, No. 193 (M238), 1338, Aug. 24, 1983.

*Primary Examiner*—Thomas J. Herbert

*Attorney, Agent, or Firm*—Thomas L. Tully

[57] ABSTRACT

A multiple-use pressure-sensitive transfer recording media which comprises a foundation and a finely porous resinous layer provided on the foundation, said porous layer comprising minute porous particles and a resinous binder material for bonding the porous particles to each other and containing a liquid ink paste substantially incompatible with the resinous binder material, said liquid ink paste comprising a pigment, a liquid fatty acid and an oil-soluble dye dissolved in said liquid fatty acid, and the weight ratio of said fatty acid to said dye being from 20:1 to 2:1. The recording media gives clear and sharp images without unevenness and blur for a multiplicity of strikes.

5 Claims, 2 Drawing Figures

MULTIPLE-USE PRESSURE-SENSITIVE TRANSFER RECORDING MEDIA

CROSS-REFERENCE TO RELATED APPLICATION

This is a continuation-in-part of application Ser. No. 753,173 filed on July 9, 1985 now U.S. Pat. No. 4,624,881.

BACKGROUND OF THE INVENTION

The present invention relates to a multiple-use pressure-sensitive transfer recording media. More particularly, it relates to a multiple-use pressure-sensitive transfer recording media for use in over-strike or multi-strike on impact type typewriters or printers.

In multi-strike operation, a recording media is advanced by a pitch of substantially the same as or somewhat longer than the character width with each strike and the direction of the travel of the recording media is switched upon each passage of the full length of the recording media. During a plurality of passes of the recording media, the same position thereof is struck plural times by the typeface or the like.

In over-strike operation, a recording media is advanced by a pitch of shorter than the character width, for instance, 1/5 of the character width, with each strike, so that a portion of each strike is effected over regions which have been previously struck and the same position of the recording media receives a plurality of impacts during a single pass. The recording media is discarded after only a single pass.

Such multiple-use pressure-sensitive transfer recording media which have been known heretofore include a recording media which comprises a foundation and a finely porous layer on the foundation, the porous layer being composed of minute porous particles and a binder material for bonding the porous particles to each other, and containing a liquid ink paste incompatible with the binder material (see Japanese Unexamined Patent Publication No. 58-29694).

In the case of conventional multiple-use pressure-sensitive transfer recording media of this type, it has been recognized that a liquid ink paste having a high viscosity of more than a certain value (4,000 cP) must be used. The reason therefor is that if a liquid ink paste having a lower viscosity is used to reduce the amount of the liquid ink paste remaining in the porous layer after repeated use of the same position of the recording media, which probably improves the over-strike or multi-strike capability, the ink paste penetrates readily into a receiving paper, which results in pale coloration or low optical density of the image and the distortion of the image due to spread or blot of the ink.

When a liquid ink paste having such a high viscosity is used, the coloration of the image obtained in the initial strike is improved, but the lowering of the optical density of the image is sharp and the unevenness of the image is marked with increasing number of strikes in the same position of the recording media, so that the number of times that the same position of the recording media can be used in continuous strikes is upmost 10.

Moreover, in the case of the above-mentioned multiple-use pressure-sensitive transfer recording media, the lowering of the optical density of the image with increasing number of strikes in the same position is less sharp than that in the case of a conventional multiple-use pressure-sensitive transfer recording media wherein no porous particles are used, whereby providing a better over-strike or multi-strike capability. However, the finely porous layer is readily broken upon impact of the typeface or the like so that portions of the porous layer are transferred to a receiving paper together with the liquid ink, which causes dark spots or stains in the image. An attempt wherein an adhesive layer is interposed between the foundation and the porous layer has been made, but the above drawback cannot be overcome even by such attempt.

It is an object of the present invention to provide a multiple-use pressure-sensitive transfer recording media which is capable of giving sharp and clear images without any unevenness for a multiplicity of strikes at the same position of the recording media and the same position of which can be used many times for transferring the ink onto a receiving paper.

Another object of the invention is to provide a multiple-use pressure-sensitive transfer recording media which has a finely porous layer which is not readily broken by impact upon repeated strikes at the same position and the same position of which can be used many times for transferring the ink onto a receiving paper.

Still another object of the invention is to provide a multiple-use pressure-sensitive transfer recording media which has both advantages mentioned above.

These and other objects of the invention will become apparent from the description hereinafter.

SUMMARY OF THE INVENTION

The present invention provides a multiple-use pressure-sensitive transfer recording media which comprises a foundation and a finely porous resinous layer provided on the foundation, said porous layer comprising minute porous particles and a resinous binder material for bonding the porous particles to each other and containing a liquid ink paste substantially incompatible with the resinous binder material, said liquid ink paste comprising a pigment, a liquid fatty acid and an oil-soluble dye dissolved in said liquid fatty acid, and the weight ratio of said fatty acid to said dye being from 20:1 to 2:1.

DETAILED DESCRIPTION

Figure 1:
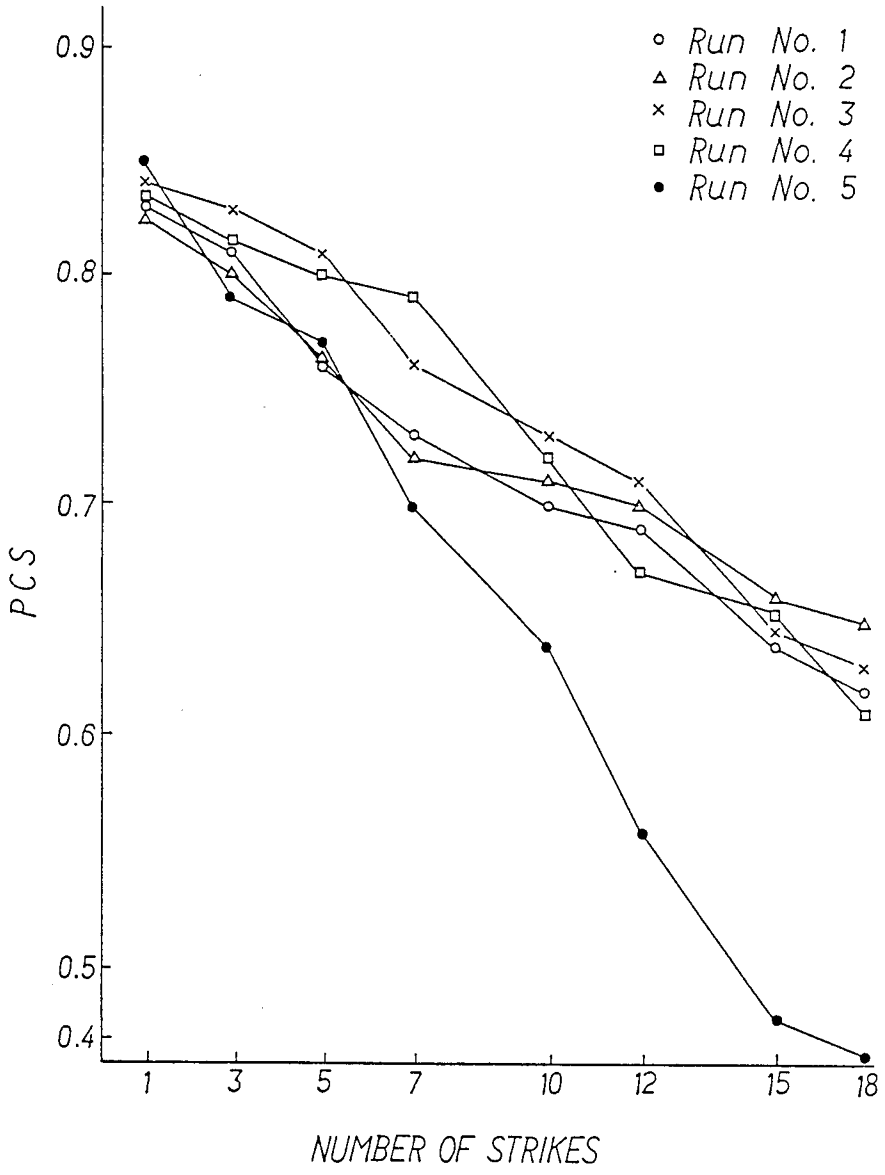
FIG. 1 is a graph showing a relationship between the number of strike at the same position of the recording media and the PCS value of the images obtained on a receiving paper with each strike with respect to multiple-use pressure-sensitive transfer recording media (Run Nos. 1 to 4) in accordance with the invention and a recording media (Run No. 5) as a comparison.

The present invention is directed to an improvement on the liquid ink paste. The invention is characterized in that there is used a liquid ink paste which contains a pigment, a liquid fatty acid and an oil-soluble dye dissolved in the liquid fatty acid, the weight ratio of the fatty acid to the dye being from 20:1 to 2:1.

The specific liquid ink paste is sufficiently penetrated into minute porous particles and maintained therein due to the specific composition thereof. As a result, small portions of the liquid ink paste contained in the porous layer are squeezed out at every time when the same position of the recording media is struck by typeface, wire dot matrix or the like and there occurs no phenomenon that a large amount of the liquid ink paste is squeezed out at once upon one strike. Further, the specific liquid ink paste does not penetrate excessively into a receiving paper due to the use of a solution of an oil-soluble dye in a fatty acid and provides sharp images with deep coloration.

Accordingly, in the case of the recording media of the invention, the lowering of the optical density of the obtained image with increasing number of strikes at the same position of the recording media is noticeably gentle, as compared with the conventional recording media, which ensures sharp and clear images without any unevenness for a multiplicity of strikes.

When the proportion of the fatty acid is more than the above range, the printing life of the recording media is reduced. That is, when printing is repeated prescribed times using the same position of the recording media, the value of print contrast signal (hereinafter referred to as "PCS") of the obtained images is lower than a desired value, e.g. 0.6. When the proportion of the fatty acid is lower than the above range, the coverlapping property of the resulting ink is reduced. That is, when a white ink is over-printed onto an image composed of a black ink or the like, the ink of the underlying layer is migrated into the overlying layer.

The liquid ink paste of the invention wherein the ratio of the liquid fatty acid to the oil-soluble dye is within the specific range satisfies both printing life and coverlapping property.

In the present invention, it is preferred that the liquid fatty acid and the oil-soluble dye are contained in amounts of 10 to 50% by weight and 1 to 10% by weight, respectively, on the basis of the total amount of the liquid ink paste. Further, it is preferred that the liquid ink paste contains 10 to 55% by weight of a mixture of the liquid fatty acid and the oil-soluble dye and has a viscosity of $2\times10^3$ to $1\times10^4$ cP at ordinary temperature. A liquid ink paste satisfying those conditions is still more improved in the printing life and coverlapping property.

Thus, the recording media of the present invention provides sharp and clear images without blur for a multiplicity, for instance, seven or more times, of strikes at the same position of the recording media.

Another feature of the invention is that a vinyl chloride-vinyl acetate copolymer containing 4 to 7 parts by weight of vinyl chloride per 5 parts by weight of vinyl acetate is used as the binder material for bonding the porous particles to each other.

The specific vinyl chloride-vinyl acetate copolymer has appropriate softness and toughness as the binder material for bonding the porous particles to each other. As a result, the obtained porous layer has appropriate softness and toughness without brittleness. Accordingly, the porous layer is not readily broken upon impact of typeface or the like for a multiplicity of strikes, which ensures repeated use of the same position of the recording media many times.

The multiple-use pressure-sensitive transfer recording media of the present invention is used preferably as an over-strike ribbon. Of course, it also is used preferably as a multi-strike ribbon.

The present invention now will be more particularly described.

In general, a multiple-use pressure-sensitive transfer recording media according to the present invention is prepared in the following manner:

Components for a liquid ink paste including coloring agent, viscosity-adjusting agent and, optionally, wetting agent and the like were mixed to give a liquid ink paste. The liquid ink paste is mixed and blended with components for a finely porous layer including porous powder and binder material, and a volatile solvent. The thus obtained dispersion is applied onto one surface of a foundation in a coating amount (the value after dried, hereinafter the same) of 10 to 30 g/m$^2$, preferably 15 to 30 g/m$^2$ by means of a coater or the like and dried to form an ink-containing porous layer wherein the liquid ink paste is contained in a finely porous layer composed of the porous powder and the binder material.

A liquid ink paste in accordance with the present invention will be described in detail.

A solution of an oil-soluble dye in a liquid fatty acid in combination with a pigment is used as a coloring agent for the liquid ink paste.

The liquid fatty acid used in the invention is preferably higher fatty acids, and mixtures thereof. Examples of the liquid fatty acid include, for instance, oleic acid, isostearic acid, and their analogues. The isostearic acid which can be used in the invention is a liquid isostearic acid which is composed of a major amount of isostearic acid and minor amounts of its homologues. Any liquid isostearic acid of technical grade can be used. Those liquid fatty acids may be used singly or as admixtures of two or more kinds thereof. The liquid fatty acid is used preferably in an amount of 10 to 50% by weight on the basis of the total amount of the liquid ink paste.

Any usual oil-soluble dyes can be used in the present invention. Examples of the oil-soluble dye include, for instance, Nigrosine Base, Spirit Black, Special Black, Victoria Blue Base and Methyl Violet Base. Those oil-soluble dyes may be used singly or as admixtures of two or more kinds thereof. The oil-soluble dye is used preferably in an amount of 1 to 10% by weight on the basis of the total amount of the liquid ink paste.

The liquid ink paste also contains a coloring pigment. Typical examples of the coloring pigment used in the present invention are carbon blacks and black toner, and the like. Typical examples of the carbon black are Printex 25 (the commercial name of a coloring carbon black made by DEGUSSA), Mogul L (the commercial name of a coloring carbon black made by Cabot Corp.), RAVEN (the commercial name of a coloring carbon black made by Columbia & Carbon Corp.). Those pigments may be used singly or as admixtures of two or more kinds thereof. The pigment is used preferably in an amount of at least 10% by weight, more preferably 10 to 40% by weight, still more preferably 20 to 40% by weight, on the basis of the total amount of the liquid ink paste.

The liquid ink paste may include a wetting agent and a viscosity-adjusting agent in addition to the above-mentioned components.

Any usual wetting agent can be used in the present invention. Examples of the wetting agent are sorbitan fatty acid esters such as sorbitan monostearate, sorbitan monoisostearate and sorbitan monooleate, lecithin, and the like. Those wetting agents may be used singly or as admixtures of two or more kinds thereof. Preferably the wetting agent is used in an amount of 3 to 30% by weight, more especially 5 to 25% by weight, on the basis of the total amount of the liquid ink paste.

Any usual viscosity-adjusting agent can be used in the present invention. Examples of the viscosity-adjusting agent are vegetable oils such as rapeseed oil, soybean oil and castor oil; mineral oils such as vitrea oil and jet oil; coldproof plasticizers such as di(2-ethylhexyl) adipate (hereinafter referred to as "DOA"), di(2-ethylhexyl) sebacate (hereinafter referred to as "DOS") and di(2-ethylhexyl) azelate (hereinafter referred to as "DOZ"); hydrocarbons such as lipolube oil; and oligomers of α-olefins. Those viscosity-adjusting agents may be used singly or as admixtures of two or more kinds thereof. The viscosity-adjusting agent is used in such amount that the resulting liquid ink paste preferably has a viscosity of $2\times10^3$ to $1\times10^4$ cP (the value as measured at 25° C., hereinafter the same). Usually the viscosity-adjusting agent is used in an amount of 20 to 50% by weight on the basis of the total amount of the liquid ink paste.

The binder material used in the present invention is a resinous material which is incompatible with the components of the liquid ink paste and compatible with the volatile solvent mentioned below, and possesses an adhesiveness against the porous particles mentioned below. Examples of the binder material are vinyl chloride-vinyl acetate copolymer, polyester resin, cellulose acetate butyrate, and the like. Those binder materials may be used singly or as admixtures of two or more kinds thereof. The binder material is used preferably in an amount of 1 to 5 parts by weight, more especially 2 to 3 parts by weight, per 10 parts by weight of the liquid ink paste.

The minute porous particles used in the present invention are preferably those which have an average porosity of 50 to 97%, more especially 60 to 93% and an average particle size of 1 to 20μ. Examples of the porous particles include inorganic porous powders such as diatomaceous earth, zeolite, porous silica powder and carbon black, and organic porous powders such as foamed polyurethane powder. Those porous powders may be used singly or as admixtures of two or more kinds thereof. The porous powder is used preferably in an amount of 1 to 4 parts by weight, more especially 2 to 3 parts by weight, per 10 parts by weight of the liquid ink paste.

As the volatile solvent, there are used one or more solvents such as methyl ethyl ketone (hereinafter referred to as "MEK"), acetone, methyl isobutyl ketone, toluene, and isoparaffin hydrocarbon oils such as IP Solvent (commercial name of an isoparaffin made by IDEMITSU KOSAN CO., LTD.).

The preferred foundation used in the present invention is films having a thickness of 3 to 50μ, including polyester film, polypropylene film and polyamide film.

In accordance with the present invention, a specific vinyl chloridevinyl acetate copolymer containing 4 to 7 parts by weight of viny chloride per 5 parts by weight of vinyl acetate is preferably used as the binder material for bonding the porous particles to each other. The reasons why such specific vinyl chloride-vinyl acetate copolymer is desirable are as follows: The preparation of a vinyl chloride-vinyl acetate copolymer having a vinyl chloride content of not more than 3 parts by weight per 5 parts by weight of vinyl acetate is very difficult. When a vinyl chloridevinyl acetate copolymer having a vinyl chloride content of not less than 9 parts by weight per 5 parts by weight of vinyl acetate is used, the resulting porous layer becomes too hard, so that the porous layer is easily broken by impact in printing. In view of the above, a specific vinyl chloride-vinyl acetate copolymer containing 4 to 7 parts by weight of vinyl chloride per 5 parts by weight of vinyl acetate, which is easily prepared, is used, which permits the formation of a finely porous layer which is hardly broken.

Further, when the average degree of polymerization of the vinyl chloride-vinyl acetate copolymer is less than 700, the copolymer is poor in heat resistance so that the liquid ink paste flows out from the porous layer when the ambient temperature is more than 60° C. A copolymer havig an average degree of polymerization of more than 950 is difficult in production. In view of the above, the average degree of polymerization of the copolymer is preferably from 700 to 950, particularly from 800 to 900.

The above-mentioned specific vinyl chloride-vinyl acetate copolymer is used as a binder material preferably in an amount of 1 to 5 parts by weight, particularly 2 to 3 parts by weight, per 10 parts by weight of the liquid ink paste.

The present invention will now be more particularly described with reference to the following Examples. These Examples are intended to illustrate the invention and not be construed to limit the scope of the invention. It is to be understood that various changes and modifications may be made in the invention without departing from the spirit and scope thereof. In all Examples, "part" means part by weight.

EXAMPLE 1

The pressure-sensitive transfer recording media shown in Table 1 were produced.

Run Nos. 1 to 4 shown in Table 1 fall within the scope of the present invention. Each pressure-sensitive transfer recording media of Run Nos. 1 to 4 were produced as follows: An oil-soluble dye was mixed with a liquid fatty acid and the resulting mixture was heated to dissolve the dye into the liquid fatty acid. The obtained solution was mixed with the additional components of the liquid ink paste, i.e. pigment, wetting agent and viscosity-adjusting agent, and the components which constituted the porous layer, i.e. porous powder and binder material, and a volatile solvent. The obtained dispersion was applied onto a polyester film having a thickness of 7μ by means of a coater and dried to give a pressure-sensitive transfer recording media having on one surface of the foundation an ink-containing porous layer in which a liquid ink paste composed of the dye solution, pigment, wetting agent and viscosity-adjusting agent was contained in a porous layer composed of the porous powder and binder material.

Run No. 5 shown in Table 1 is directed to a recording media as a comparison which had an ink-containing porous layer similar to that of the above-mentioned conventional pressure-sensitive transfer recording media.

With respect to each recording media of Run Nos. 1 to 5, printing test was carried out using an electronic typewriter AP500 made by Canon Inc. Each recording media was fitted in the ribbon cassette of the typewriter and printing was carried out repeatedly in such a manner that the same position of the ribbon was struck by the same typeface, while the printing position on a recording paper (wood free paper) was changed with each strike. With respect to the printed images thus obtained, the PCS value was measured by an optical character reader (Kidder model 082). The results are shown in FIG. 1. In the graph of FIG. 1, the PCS value is plotted as ordinate and the number of strikes at the same position of the recording media as abscissa.

As is clear from the graph shown in FIG. 1, in the case of the recording media of Run Nos. 1 to 4 according to the present invention, the lowering of the optical density of the printed image with increasing number of strikes is noticeably gentle, as compared with the recording media of Run No. 5 as a comparison, and the having a PCS value of not less than 0.6 was about two times that of the recording media of Run No. 5.

Moreover, there were produced recording media where each of the liquid ink pastes of Run Nos. 1 to 4 was contained in each of the porous layers A, B and C shown in Table 2. With respect to the recording media, the printing test was carried out in the same manner as above. As a result, each recording media exhibited the same printing ability as that of each corresponding recording media of Run Nos. 1 to 4 using the same liquid ink paste and there were almost observed no influences resulting from the difference in the construction of the porous layer.

TABLE 1

| | Composition for liquid ink paste | | | | | | | | | |
|---|---|---|---|---|---|---|---|---|---|---|
| | Liquid medium for dissolving dye | | Oil-soluble dye | | Pigment | | Wetting agent | | Viscosity-adjusting agent | |
| | Kind | Amount (part) | Kind | Amount (part) | Kind | Amount (part) | Kind | Amount (part) | Kind | Amount (part) |
| Run No. 1 | Oleic acid | 4 | Nigrosine Base EX (Note 2) | 2 | RAVEN 1255 | 4 | Sorbitan monoisostearate | 1 | DOZ | 9 |
| Run No. 2 | Oleic acid | 4 | Nigrosine Base EX (Note 2) | 2 | Black toner | 5 | Sorbitan monooleate | 4 | DOA | 5 |
| Run No. 3 | Isostearic acid | 8 | Nigrosine Base EX (Note 2)<br>Special Black EB | 1<br>1 | Black toner<br>Printex 25 | 8<br>4 | Sorbitan monoisostearate | 6 | Rapeseed oil<br>DOZ<br>Vitrea oil | 4<br>4<br>3 |
| Run No. 4 | Isostearic acid | 3 | Nigrosine Base EX (Note 2) | 1 | Black toner<br>Mogul L | 5<br>3 | Lecithin | 3 | Rapeseed oil<br>DOS<br>Lipolube oil | 6<br>2<br>1 |
| Run No. 5 | Polyoxyethylene sorbitol hexaoleate | 8 | Nigrosine Base EX (Note 2) | 3 | Carbon black<br>Alkali Blue | 3<br>1 | Beef tallow fatty acid ester | 1 | Vitrea oil | 3 |

| | Viscosity of liquid ink paste at 25° C. (cP) | Composition for porous layer (Note 1) | | | | | | Coating amount after being dried (g/m²) |
|---|---|---|---|---|---|---|---|---|
| | | Porous powder | | Binder | | Solvent | | |
| | | Kind | Amount (part) | Kind | Amount (part) | Kind | Amount (part) | |
| Run No. 1 | 400 | Diatomaceous earth (Note 3) | 2 | VC-VAc copolymer (Note 4) | 2 | MEK | 18 | 20 |
| Run No. 2 | 1,000 | Diatomaceous earth (Note 3) | 2 | VC-VAc copolymer (Note 4) | 2 | MEK | 18 | 22 |
| Run No. 3 | 2,000 | Diatomaceous earth (Note 3) | 2 | VC-VAc copolymer (Note 4) | 2 | MEK | 18 | 20 |
| Run No. 4 | 3,500 | Diatomaceous earth (Note 3) | 2 | VC-VAc copolymer (Note 4) | 2 | MEK | 18 | 19 |
| Run No. 5 | 6,000 | Diatomaceous earth (Note 3) | 2 | VC-VAc copolymer (Note 4) | 4 | Toluene<br>MEK | 5<br>13 | 19 |

Note 1: The amount of each component means the number of parts per 10 parts of the liquid ink paste.
Note 2: Commercial name of Nigrosine Base made by Oriento Kagaku Kabushiki Kaisha
Note 3: Diatomaceous earth having an average particle size of 7μ and an average porosity of 75%
Note 4: Vinyl chloride-vinyl acetate copolymer having a vinyl chloride content of 87% by weight number of strikes that can be made to produce images

TABLE 2

| | Composition for porous layer (Note 1) | | | | | | Coating amount (g/m²) |
|---|---|---|---|---|---|---|---|
| | Porous powder | | Binder material | | Solvent | | |
| | Kind | Amount (part) | Kind | Amount (part) | Kind | Amount (part) | |
| A | Diatomaceous earth (Note 2) | 2 | Cellulose acetate butyrate | 2 | MEK | 14 | 20 |
| B | Diatomaceous earth (Note 2) | 2 | Vinyl chloride-vinyl acetate copolymer (Note 3) | 3 | MEK | 17 | 20 |

TABLE 2-continued

| | Composition for porous layer (Note 1) | | | | | | Coating |
|---|---|---|---|---|---|---|---|
| | Porous powder | | Binder material | | Solvent | | |
| | Kind | Amount (part) | Kind | Amount (part) | Kind | Amount (part) | amount ($g/m^2$) |
| C | Diatomaceous earth (Note 2) | 3 | Polyester resin | 3 | MEK | 19 | 20 |

Note
1: The amount of each component means the number of parts per 10 parts of the liquid ink paste shown in Table 1.
2: The same as described in Note 3 of Table 1.
3: The copolymer had a vinyl chloride content of 65% by weight.

EXAMPLE 2

There were produced 90 kinds of pressure-sensitive transfer recording media (Run Nos. 6 to 95) by combining 6 kinds of liquid ink pastes (Nos. 1 to 6) shown in Table 3 with 15 kinds of porous layer compositions (Nos. 1 to 15) shown in Table 4 in the same manner as in Example 1. Each recording media had an ink-containing porous layer having a coating amount of 20 $g/m^2$ after dried on a polyester film having a thickness of 7μ.

Among the liquid ink pastes shown in Table 3, the ink paste Nos. 1 to 4 fall within the scope of the invention and the ink paste Nos. 5 and 6 do not fall within the scope of the invention.

With respect to the obtained recording media, printing test was carried out in the same manner as in Example 1. The results are shown in Table 5. In Table 5, "PCS×100" means the value obtained by multiplying the PCS (VIS) value of the image obtained in the tenth strike, by 100, and "number of strikes" means the number of strikes that a portion of the porous layer begins to be transferred.

TABLE 3

| Liquid ink paste No. | Coloring agent: Kind | Coloring agent: Amount (part) | Wetting agent: Kind | Wetting agent: Amount (part) | Viscosity-adjusting agent: Kind | Viscosity-adjusting agent: Amount (part) | Viscosity at 25° C. (cP) |
|---|---|---|---|---|---|---|---|
| 1 | Solution of 2 parts of Nigrosine Base EX in 4 parts of oleic acid | 6 | Sorbitan mono-stearate | 1 | DOZ | 9 | 400 |
| | Carbon black | 4 | | | | | |
| 2 | Solution of 2 parts of Nigrosine Base EX in 4 parts of oleic acid | 6 | Sorbitan mono-oleate | 4 | DOA | 5 | 1,000 |
| | Black toner | 5 | | | | | |
| 3 | Solution of 1 part of Nigrosine Base EX and 1 part of Special Black EB in 8 parts of iso-stearic acid | 10 | Sorbitan monoiso-stearate | 6 | DOZ<br>Rapeseed oil<br>Vitrea oil | 4<br>6<br>3 | 2,000 |
| | Black toner | 8 | | | | | |
| | Carbon black | 4 | | | | | |
| 4 | Solution of 1 part of Nigrosine Base EX in 3 parts of isostearic acid | 4 | Lecithin | 3 | DOS<br>Rapeseed oil<br>Lipolube oil | 2<br>6<br>1 | 2,000 |
| | Carbon black | 3 | | | | | |
| | Black toner | 5 | | | | | |
| 5 | Alkali Blue toner<br>Carbon Black | 2<br>4 | Non | | Rapeseed oil<br>Lanolin | 5<br>5 | Semi-solid |
| 6 | Alkali Blue toner | 1 | Non | | Hydro-philic petrola-tum | 12 | 10,000 |
| | Carbon Black | 4 | | | | | |

TABLE 4

| Porous layer composition No. | Porous powder: Kind | Porous powder: Amount (part) (Note 1) | Binder material, Vinyl chloride-vinyl acetate copolymer: Ratio of vinyl chloride/vinyl acetate (by weight) | Average degree of polymerization | Amount (part) (Note 1) |
|---|---|---|---|---|---|
| 1 | Diatomaceous earth (Note 2) | 2 | 4/5 | 760 | 2 |
| 2 | Diatomaceous earth (Note 2) | 2 | 5/5 | 780 | 2 |
| 3 | Diatomaceous earth (Note 2) | 2 | 6/5 | 830 | 2 |
| 4 | Diatomaceous earth (Note 2) | 2 | 7/5 | 930 | 2 |
| 5 | Whiton SB | 2 | 4/5 | 760 | 5 |

TABLE 4-continued

| | Porous powder | | Binder material Vinyl chloride-vinyl acetate copolymer | | |
|---|---|---|---|---|---|
| Porous layer composition No. | Kind | Amount (part) (Note 1) | Ratio of vinyl chloride/ vinyl acetate (by weight) | Average degree of poly-merization | Amount (part) (Note 1) |
| | (Note 3) | | | | |
| 6 | Whiton SB (Note 3) | 2 | 5/5 | 780 | 5 |
| 7 | Whiton SB (Note 3) | 2 | 6/5 | 830 | 5 |
| 8 | Whiton SB (Note 3) | 2 | 7/5 | 930 | 5 |
| 9 | Silica 300 (Note 4) | 1 | 4/5 | 760 | 5 |
| 10 | Silica 300 (Note 4) | 1 | 5/5 | 780 | 5 |
| 11 | Silica 300 (Note 4) | 1 | 6/5 | 830 | 5 |
| 12 | Silica 300 (Note 4) | 1 | 7/5 | 930 | 5 |
| 13 | Diatomaceous earth (Note 2) | 2 | 10/5 | 420 | 2 |
| 14 | Whiton SB | 2 | 10/5 | 420 | 5 |
| 15 | Silica 300 | 1 | 10/5 | 420 | 5 |

Note
1: The amount of each component means the number of parts per 10 parts of the liquid ink paste.
2: The same as described in Note 3 of Table 1
3: Commercial name of calcium carbonate made by Shiraishi Calcium Kabushiki Kaisha
4: Commercial name of porous silica powder made by Nippon Aerosil Kabushiki Kaisha

TABLE 5

| Run No. | Liquid ink paste No. | Porous layer composition No. | PCS × 100 | Number of strikes |
|---|---|---|---|---|
| 6 | 1 | 1 | 70 | >30 |
| 7 | 2 | 1 | 71 | " |
| 8 | 3 | 1 | 74 | " |
| 9 | 4 | 1 | 73 | " |
| 10 | 5 | 1 | 65 | " |
| 11 | 6 | 1 | 60 | " |
| 12 | 1 | 2 | 71 | " |
| 13 | 2 | 2 | 71 | " |
| 14 | 3 | 2 | 74 | " |
| 15 | 4 | 2 | 74 | " |
| 16 | 5 | 2 | 64 | " |
| 17 | 6 | 2 | 62 | " |
| 18 | 1 | 3 | 72 | " |
| 19 | 2 | 3 | 72 | " |
| 20 | 3 | 3 | 75 | " |
| 21 | 4 | 3 | 75 | " |
| 22 | 5 | 3 | 65 | " |
| 23 | 6 | 3 | 62 | " |
| 24 | 1 | 4 | 73 | " |
| 25 | 2 | 4 | 73 | " |
| 26 | 3 | 4 | 75 | " |
| 27 | 4 | 4 | 74 | " |
| 28 | 5 | 4 | 66 | " |
| 29 | 6 | 4 | 63 | " |
| 30 | 1 | 5 | 70 | " |
| 31 | 2 | 5 | 70 | " |
| 32 | 3 | 5 | 72 | " |
| 33 | 4 | 5 | 71 | " |
| 34 | 5 | 5 | 60 | " |
| 35 | 6 | 5 | 59 | " |
| 36 | 1 | 6 | 71 | " |
| 37 | 2 | 6 | 71 | " |
| 38 | 3 | 6 | 72 | " |
| 39 | 4 | 6 | 70 | " |
| 40 | 5 | 6 | 60 | " |
| 41 | 6 | 6 | 60 | " |
| 42 | 1 | 7 | 70 | " |
| 43 | 2 | 7 | 70 | " |
| 44 | 3 | 7 | 72 | " |
| 45 | 4 | 7 | 73 | " |
| 46 | 5 | 7 | 59 | " |
| 47 | 6 | 7 | 58 | " |
| 48 | 1 | 8 | 73 | " |
| 49 | 2 | 8 | 72 | " |

TABLE 5-continued

| Run No. | Liquid ink paste No. | Porous layer composition No. | PCS × 100 | Number of strikes |
|---|---|---|---|---|
| 50 | 3 | 8 | 76 | " |
| 51 | 4 | 8 | 70 | " |
| 52 | 5 | 8 | 58 | " |
| 53 | 6 | 8 | 60 | " |
| 54 | 1 | 9 | 70 | " |
| 55 | 2 | 9 | 72 | " |
| 56 | 3 | 9 | 77 | " |
| 57 | 4 | 9 | 74 | " |
| 58 | 5 | 9 | 59 | " |
| 59 | 6 | 9 | 63 | " |
| 60 | 1 | 10 | 71 | " |
| 61 | 2 | 10 | 72 | " |
| 62 | 3 | 10 | 74 | " |
| 63 | 4 | 10 | 73 | " |
| 64 | 5 | 10 | 61 | " |
| 65 | 6 | 10 | 62 | " |
| 66 | 1 | 11 | 74 | " |
| 67 | 2 | 11 | 71 | " |
| 68 | 3 | 11 | 76 | " |
| 69 | 4 | 11 | 74 | " |
| 70 | 5 | 11 | 62 | " |
| 71 | 6 | 11 | 60 | " |
| 72 | 1 | 12 | 74 | " |
| 73 | 2 | 12 | 75 | " |
| 74 | 3 | 12 | 72 | " |
| 75 | 4 | 12 | 72 | " |
| 76 | 5 | 12 | 64 | " |
| 77 | 6 | 12 | 61 | " |
| 78 | 1 | 13 | 70 | 8 |
| 79 | 2 | 13 | 70 | 7 |
| 80 | 3 | 13 | 71 | 8 |
| 81 | 4 | 13 | 69 | 9 |
| 82 | 5 | 13 | 60 | 8 |
| 83 | 6 | 13 | 58 | 7 |
| 84 | 1 | 14 | 69 | 8 |
| 85 | 2 | 14 | 70 | 8 |
| 86 | 3 | 14 | 70 | 7 |
| 87 | 4 | 14 | 69 | 6 |
| 88 | 5 | 14 | 58 | 9 |
| 89 | 6 | 14 | 60 | 9 |
| 90 | 1 | 15 | 71 | 8 |
| 91 | 2 | 15 | 70 | 9 |
| 92 | 3 | 15 | 71 | 10 |
| 93 | 4 | 15 | 72 | 10 |

TABLE 5-continued

| Run No. | Liquid ink paste No. | Porous layer composition No. | PCS × 100 | Number of strikes |
|---|---|---|---|---|
| 94 | 5 | 15 | 61 | 8 |
| 95 | 6 | 15 | 60 | 9 |

As is clear from the results in Table 5, in the case of the recording media of Run Nos. 6 to 77 wherein specific vinyl chloride-vinyl acetate copolymers were used as a binder material, there occurred no spots or stains in the printed image, even when printing was repeated at the same position of the recording media not less than 30 times (for instance, 40 to 70 times). Further, the optical density of the image obtained by the 10th strike was high, i.e. ranging from 0.6 to a little less than 0.8. The optical density of the image obtained by the 30th strike ranged from 0.3 to 0.45.

In contrast thereto, in the case of the recording media of Run Nos. 78 to 95 wherein vinyl chloride-vinyl acetate copolymers having an excessively high vinyl chloride content were used as a binder material, a portion of the porous layer was transferred with the liquid ink onto a recording paper, even when printing was repeated less than ten times. As a result, for instance, in the case that the color of liquid ink was black, black spots or stains were produced in the printed image, which resulted in spoiling of the image, even though the image had a high optical density enough to be read.

Moreover, in the case of the recording media of Run Nos. 6 to 9, 12 to 15, 18 to 21, 24 to 27, 30 to 33, 36 to 39, 42 to 45, 48 to 51, 54 to 57, 60 to 63, 66 to 69 and 72 to 75 in accordance with the invention wherein specific vinyl chloride-vinyl acetate copolymers were also used as a binder material, any spots or stains resulting from the transfer of the porous layer per se were not produced when printing was repeated at the same position of the recording media not less than 30 times and the optical density of the image obtained in the 10th strike was high, i.e. ranging from 0.7 to a little under 0.8.

EXAMPLE 3

There were produced 5 kinds of pressure-sensitive transfer recording media (Run Nos. 96 to 100) by combining the liquid ink pastes shown in Table 6 with the porous layer composition of No. 3 shown in Table 4 in the same manner as in Example 1.

Figure 2:
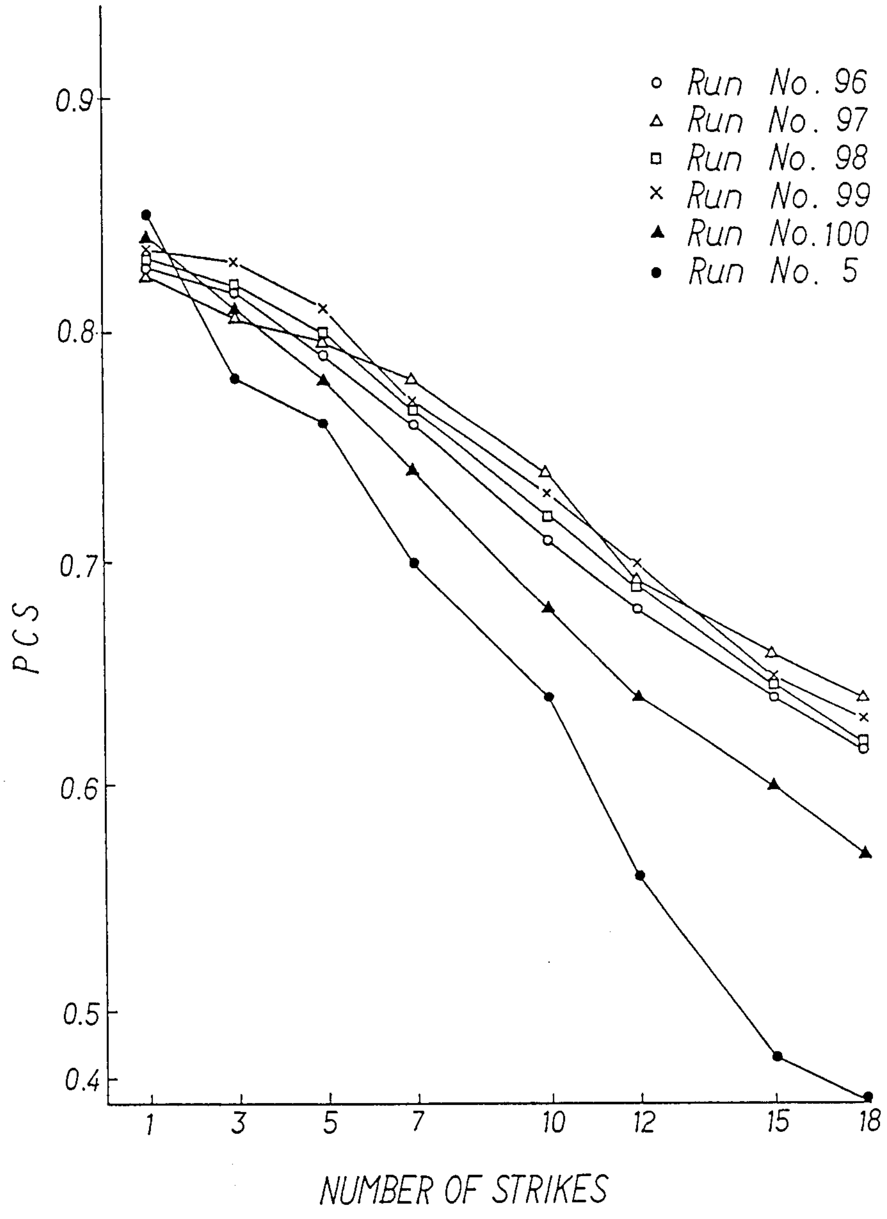
FIG. 2 is a graph showing a relationship between the number of strike at the same position of the recording media and the PCS value of the images obtained on a receiving paper with each strike with respect to multiple-use pressure-sensitive transfer recording media (Run Nos. 96 to 100) in accordance with the invention.

With respect to each recording media, printing test was carried out in the same manner as in Example 1. The results are shown in FIG. 2 together with the results obtained with Run No. 5 in Example 1.

TABLE 6

| | Liquid fatty acid | | Oil-soluble dye | | Pigment | | Wetting agent | | Viscosity-adjusting agent | | Viscosity of liquid ink |
|---|---|---|---|---|---|---|---|---|---|---|---|
| | Kind | Amount (part) | Kind | Amount (part) | Kind | Amount (part) | Kind | Amount (part) | Kind | Amount (part) | paste at 25° C. (cP) |
| Run No. 96 | Isostearic acid | 15 | Nigrosine Base EX | 1 | Black toner<br>Printex 25 | 8<br>4 | Sorbitan monoisostearate | 5 | Rapeseed oil<br>DOZ<br>Vitrea oil | 2<br>2<br>1 | 4,000 |
| Run No. 97 | Isostearic acid | 4 | Nigrosine Base EX | 2 | RAVEN 1255 | 4 | Sorbitan monoisostearate | 5 | DOZ | 5 | 2,100 |
| Run No. 98 | Isostearic acid | 3 | Nigrosine Base EX | 1 | Black toner<br>RAVEN 1255 | 5<br>3 | Lecithin | 1 | Rapeseed oil<br>DOZ<br>Lipolube oil | 6<br>3<br>1 | 6,200 |
| Run No. 99 | Isostearic acid | 4 | Nigrosine Base EX<br>Special Black EB | 1<br>1 | Black toner<br>RAVEN 1255 | 4<br>4 | Sorbitan monoisostearate | 1 | DOZ | 5 | 8,500 |
| Run No. 100 | Isostearic acid | 20 | Nigrosine Base EX | 1 | Black toner<br>Printex 25 | 8<br>4 | Sorbitan monoisostearate | 1 | Rapeseed oil<br>DOZ | 2<br>2 | 4,000 |

In accordance with the invention, it is a measure for evaluation of a desired printing life that a difference in PCS value between an image obtained by the first strike and an image obtained by the seventh strike on the same position of the recording media is smaller than about 0.1. When the results shown in FIG. 2 are evaluated from this standpoint, the recording media of Run Nos. 96 to 100 come up to the above criterion, while the recording media of Run No. 5 as a comparison comes short of the above criterion because the above-mentioned difference in PCS value is about 0.2.

In addition to the ingredients or elements used in the Examples, other ingredients or elements can be used in the Examples as set forth in the specification to obtain substantially the same results.

What is claimed is:

1. A multiple-use pressure-sensitive transfer recording media which comprises a foundation and a finely porous resinous layer provided on the foundation, said porous layer comprising minute porous particles and a resinous binder material for bonding the porous particles to each other and containing a liquid ink paste substantially incompatible with the resinous binder material, said liquid ink paste comprising a pigment, a liquid fatty acid and an oil-soluble dye dissolved in said liquid fatty acid, and the weight ratio of said fatty acid to said dye being from 20:1 to 2:1.

2. The recording media of claim 1, wherein said ink paste contains at least 10% by weight of the pigment.

3. The recording media of claim 2, wherein said liquid ink paste contains 10 to 50% by weight of said liquid fatty acid and 1 to 10% by weight of said oil-soluble dye.

4. The recording media of claim 2, wherein said liquid ink paste contains 10 to 55% by weight of a mixture of said liquid fatty acid and said oil-soluble dye and has a viscosity of $2\times10^3$ to $1\times10^4$ cP at ordinary temperature.

5. The recording media of claim 2, wherein said liquid fatty acid is isostearic acid.

* * * * *